United States Patent
Ehrmann

(10) Patent No.: US 10,561,134 B2
(45) Date of Patent: Feb. 18, 2020

(54) HOOF TAP DEVICE

(71) Applicant: Douglas Gerard Ehrmann, Chester, NY (US)

(72) Inventor: Douglas Gerard Ehrmann, Chester, NY (US)

( * ) Notice: Subject to any disclaimer, the term of this patent is extended or adjusted under 35 U.S.C. 154(b) by 298 days.

(21) Appl. No.: 15/339,001

(22) Filed: Oct. 31, 2016

(65) Prior Publication Data
US 2017/0339938 A1 Nov. 30, 2017

Related U.S. Application Data

(60) Provisional application No. 62/340,869, filed on May 24, 2016.

(51) Int. Cl.
*A01L 1/02* (2006.01)

(52) U.S. Cl.
CPC ..................... *A01L 1/02* (2013.01)

(58) Field of Classification Search
CPC ..... A01L 1/02; A01L 1/04; A01L 3/02; A01L 3/04; A01L 3/06; A01L 5/00; A01L 7/004; A01L 7/06; A01L 7/08; A01L 9/00; A61B 17/064; A61B 2017/0641; A61B 17/0642
See application file for complete search history.

(56) References Cited

U.S. PATENT DOCUMENTS

| | | | | |
|---|---|---|---|---|
| 581,634 A | * | 4/1897 | Veal | A47G 27/0462 16/8 |
| 1,202,412 A | * | 10/1916 | O'Donnell | A41F 15/02 211/30 |
| 1,378,942 A | * | 5/1921 | Farry | A01L 7/00 168/31 |
| 1,708,005 A | * | 4/1929 | Wilson | A01G 5/04 132/280 |
| 2,115,651 A | * | 4/1938 | Sexton | A01L 5/00 168/12 |
| 3,142,878 A | * | 8/1964 | Santora | A44B 1/42 24/113 R |
| 3,869,957 A | * | 3/1975 | Barth | F16B 15/0015 411/447 |
| 3,939,828 A | * | 2/1976 | Mohr | A61B 17/68 606/916 |
| 4,333,532 A | * | 6/1982 | Mennick | A01L 5/00 168/24 |

(Continued)

FOREIGN PATENT DOCUMENTS

| | | |
|---|---|---|
| CH | 657249 A5 | 8/1986 |
| DE | 102006006880 A1 | 8/2007 |

(Continued)

OTHER PUBLICATIONS

European Patent Office—Written Opinion dated Jun. 6, 2019.

*Primary Examiner* — Kathleen I Alker
(74) *Attorney, Agent, or Firm* — Michael J. Brown

(57) ABSTRACT

A hoof tap device is provided. Each hoof tap device has a tap bridge from which a plurality of tap posts transversely extend. Each hoof tap device may be dimensioned and adapted so that a plurality of the hoof tap devices may be spaced apart along and just inward of the hoof wall of a horse hoof so that at least a portion of each back edge protrudes therefrom, enabling traction, preventing excessive wear, and improving the movement of the hoof by allowing it to flex and expand naturally during use.

10 Claims, 2 Drawing Sheets

(56) References Cited

U.S. PATENT DOCUMENTS

| | | | | |
|---|---|---|---|---|
| 4,454,875 A * | 6/1984 | Pratt | ........................ | F16B 15/02 606/219 |
| 4,570,623 A * | 2/1986 | Ellison | ................ | A61B 17/0642 606/75 |
| 4,616,709 A * | 10/1986 | Lee | ............................ | A01L 7/06 168/13 |
| 4,635,637 A * | 1/1987 | Schreiber | ............. | A61B 17/064 606/219 |
| 4,757,864 A * | 7/1988 | Juncker | ...................... | A01L 1/04 168/11 |
| 4,838,254 A * | 6/1989 | Gauthier | ............ | A61B 17/0642 606/75 |
| 4,994,073 A * | 2/1991 | Green | .................. | A61B 17/064 411/457 |
| 5,027,904 A * | 7/1991 | Miller | ........................ | A01L 7/04 168/33 |
| 5,222,975 A * | 6/1993 | Crainich | ............ | A61B 17/0644 227/901 |
| 5,246,443 A * | 9/1993 | Mai | .................... | A61B 17/0642 606/219 |
| 5,366,479 A * | 11/1994 | McGarry | ............ | A61B 17/0684 227/902 |
| 5,439,479 A * | 8/1995 | Shichman | .......... | A61B 17/0643 411/457 |
| 5,449,359 A * | 9/1995 | Groiso | ................ | A61B 17/0642 411/459 |
| 5,505,264 A | 4/1996 | Morris | | |
| 5,662,655 A * | 9/1997 | Laboureau | ......... | A61B 17/0642 606/297 |
| 5,674,245 A * | 10/1997 | Ilgen | ........................ | A01L 15/00 606/212 |
| 5,833,695 A * | 11/1998 | Yoon | .................... | A61B 17/072 606/139 |
| 5,941,890 A * | 8/1999 | Voegele | ................ | A61B 90/39 411/457 |
| 6,059,787 A * | 5/2000 | Allen | ................ | A61B 17/0642 606/75 |
| 6,571,881 B1 * | 6/2003 | Nolan | ........................ | A01L 7/00 168/12 |
| 6,868,914 B2 * | 3/2005 | Kolonia, Sr. | ............. | A01L 5/00 168/14 |
| 7,108,709 B2 * | 9/2006 | Cummins | ........... | A61B 17/0644 606/215 |
| D574,498 S * | 8/2008 | Fox | ............................... | D24/171 |
| 7,669,747 B2 * | 3/2010 | Weisenburgh | .......... | A61B 17/32 227/180.1 |
| 7,717,186 B2 * | 5/2010 | Daine | ........................ | A01L 7/00 168/17 |
| D625,417 S * | 10/2010 | Fox | ............................... | D24/171 |
| 8,365,976 B2 * | 2/2013 | Hess | ................... | A61B 17/0644 227/181.1 |
| 8,679,123 B2 * | 3/2014 | Kinmon | ............. | A61B 17/0642 606/219 |
| 8,721,646 B2 * | 5/2014 | Fox | .................... | A61B 17/0642 606/75 |
| D706,927 S * | 6/2014 | Cheney | ........................ | D24/145 |
| 8,808,294 B2 * | 8/2014 | Fox | .................... | A61B 17/0642 606/75 |
| 8,900,281 B2 * | 12/2014 | Reisberg | ............ | A61B 17/8076 606/283 |
| 9,017,331 B2 * | 4/2015 | Fox | .................... | A61B 17/0642 606/75 |
| D777,329 S * | 1/2017 | Montoya | ...................... | D24/155 |
| D822,206 S * | 7/2018 | Shelton, IV | .................. | D24/145 |
| D826,405 S * | 8/2018 | Shelton, IV | .................. | D24/145 |
| 10,064,618 B2 * | 9/2018 | Allen | ................ | A61B 17/0642 |
| 10,166,026 B2 * | 1/2019 | Shelton, IV | ........ | A61B 17/0469 |
| 2007/0093839 A1 * | 4/2007 | Beckendorf | ........ | A61B 17/0642 606/75 |
| 2013/0184768 A1 * | 7/2013 | McIff et al. | ........ | A61B 17/8685 606/301 |
| 2017/0056001 A1 * | 3/2017 | Shelton, IV | ......... | A61B 17/068 |

FOREIGN PATENT DOCUMENTS

| | | | | |
|---|---|---|---|---|
| FR | 428706 A | | 9/1911 | |
| FR | 463719 A | | 3/1914 | |
| GB | 1213257 A | * | 11/1970 | ............... A01L 5/00 |
| WO | 2009143844 A1 | | 12/2009 | |

\* cited by examiner

HOOF TAP DEVICE

CROSS-REFERENCE TO RELATED APPLICATION

This application claims the benefit of priority of U.S. provisional application No. 62/340,869, filed 24 May 2016, the contents of which are herein incorporated by reference.

BACKGROUND OF THE INVENTION

The present invention relates to horseshoes and, more particularly, to an improved horseshoe-like device which allows for proper expansion of the hoof when the hoof hits the ground.

The purpose of horseshoes is to provide protection against excessive and/or uneven wear of the hoof, and against cuts, bruises, and other injuries thereto, as well as providing better traction as compared to a shoeless horse's hoof. However, horseshoes tend to interfere with the natural mechanical functioning of the horse's hoof, which tend to expand when the hoof hits the ground with each step, thereby providing a form of shock absorption, reducing strain on the horse's muscles and tendons.

A horseshoe, in order to provide the above mentioned benefits of a barrier and traction device, are necessarily rigid. Being a rigid barrier rigidly fixed to the hoof, however, between the ground and the horse's hoof, does not allow for proper expansion of the hoof when the hoof hits the ground, thereby restricting natural movement of the hoof. Alternative horse boots have been offered as a solution, but such horse boots can be loose, cumbersome, and sometime difficult to put on and keep on.

As can be seen, there is a need for a hoof tap device for the protection a horses' hoof, while facilitating the natural movement and expansion of the hoof as the horse steps. The hoof tap device provides additional traction, yet stops excessive wear without the use of a full horse shoe, while improving the movement of the hoof by allowing the hoof to flex and expand naturally, and, in some cases, providing correction of the hoof.

SUMMARY OF THE INVENTION

In one aspect of the present invention, a hoof tap device for the protection a horses' hoof, while facilitating the natural movement and expansion thereof include a tap bridge providing a back edge; and a plurality of tap posts transversely extending from the tap bridge, wherein the plurality of tap posts is opposing the back edge, wherein the tap bridge is dimensioned and adapted to protrude from a portion of a horse hoof wall.

In another aspect of the present invention, the hoof tap device includes a tap bridge providing a back edge; a plurality of tap posts transversely extending from the tap bridge, wherein the plurality of tap posts is opposing the back edge; a triangular piercing tip disposed along a distal end of each of the plurality of tap posts; and a tap tooth disposed between two adjacent tap posts of the plurality of tap posts, wherein the tap bridge extends for approximately 1.125" inches and each of the plurality if tap posts extends for approximately 0.4375" inches from the tap bridge to its respective distal end so that the tap bridge is dimensioned and adapted to protrude from a portion of a horse hoof wall.

In yet another aspect of the present invention, a method of protecting a horse's hoof from excessive wear when the horse steps, while enabling proper expansion of the hoof at the same time, includes the steps of providing a plurality of the above mentioned tap hoof devices and inserting the plurality of the tap hoof devices spaced apart just inward of a hoof wall of the hoof so that at least a portion of each respective back edge protrudes from a bottom of the hoof.

These and other features, aspects and advantages of the present invention will become better understood with reference to the following drawings, description and claims.

DETAILED DESCRIPTION OF THE INVENTION

Figure 1:
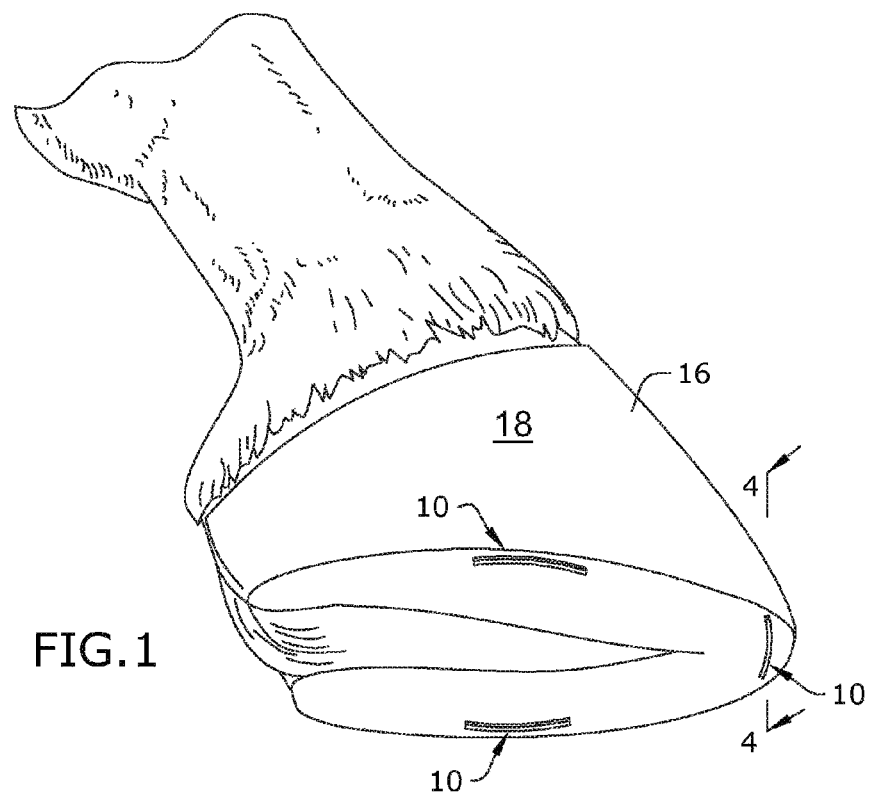
FIG. 1 is a perspective view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a hoof tap device, wherein each hoof tap device has a tap bridge from which a plurality of tap posts transversely extend. Each hoof tap device may be dimensioned and adapted so that a plurality of the hoof tap devices may be spaced apart along and just inward of the hoof wall of a horse hoof so that at least a portion of each back edge protrudes therefrom, enabling traction, preventing excessive wear, and improving the movement of the hoof by allowing it to flex and expand naturally during use.

Referring to FIGS. 1 through 4, the present invention may include a hoof tap device 10. Each hoof tap device 10 may provide a tap bridge 14 extending between tap posts 101 and 102. Each hoof tap device 10 can be made in different sizes with different materials, including stainless steel, titanium, or other sufficiently strong and durable materials. Each hoof tap device 10 can be laser cut or stamped from solid sheet of hard metal, plastic, or the like. The hoof tap device 10 may also be molded.

Tap bridge 14 forms a curve extending between tap posts 101 and 102, with tap post 103 located midway along the curve, and convex side 201 and concave side 202 extending between tap posts 101 and 102 on opposite sides of tap bridge 40.

In certain embodiment, a continuous back edge 30 may be shared and/or defined by the tap bridge 14 and the tap posts 101 and 102. Each tap post 101, 102 and 103 may provide a piercing tip 20 along its distal end. Between any two tap posts 101 and 103 or 102 and 103 may be a smaller tap tooth 22. Barb 50 extends on one side of tap posts 101 and 102.

Figure 2:
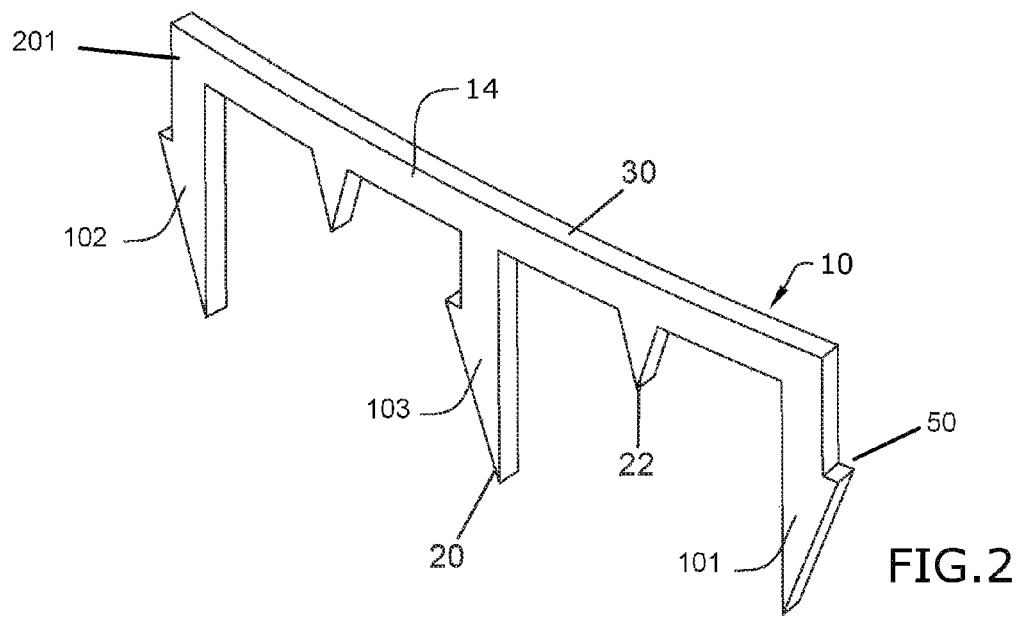
FIG. 2 is a front perspective view of an exemplary embodiment of the present invention.
Figure 3:
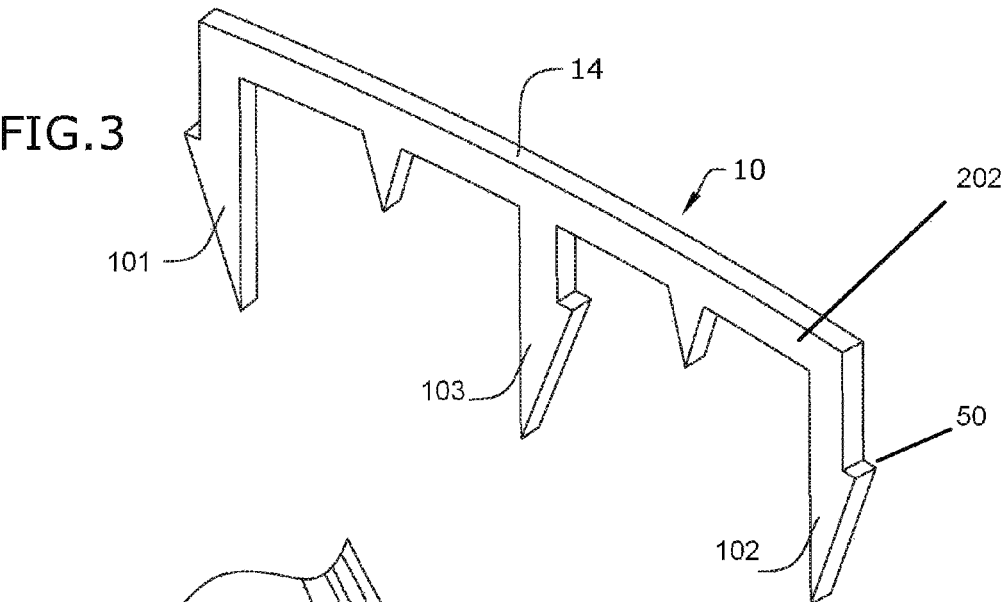
FIG. 3 is a rear perspective view of an exemplary embodiment of the present invention.

As shown in FIGS. 1, 2 and 3, the back edge 30 is preferably curved, so that when placed inward of the hoof wall 16, the hoof tap device 10 may follow a curve of hoof wall 16 and/or a curve of the hoof 18.

Figure 4:
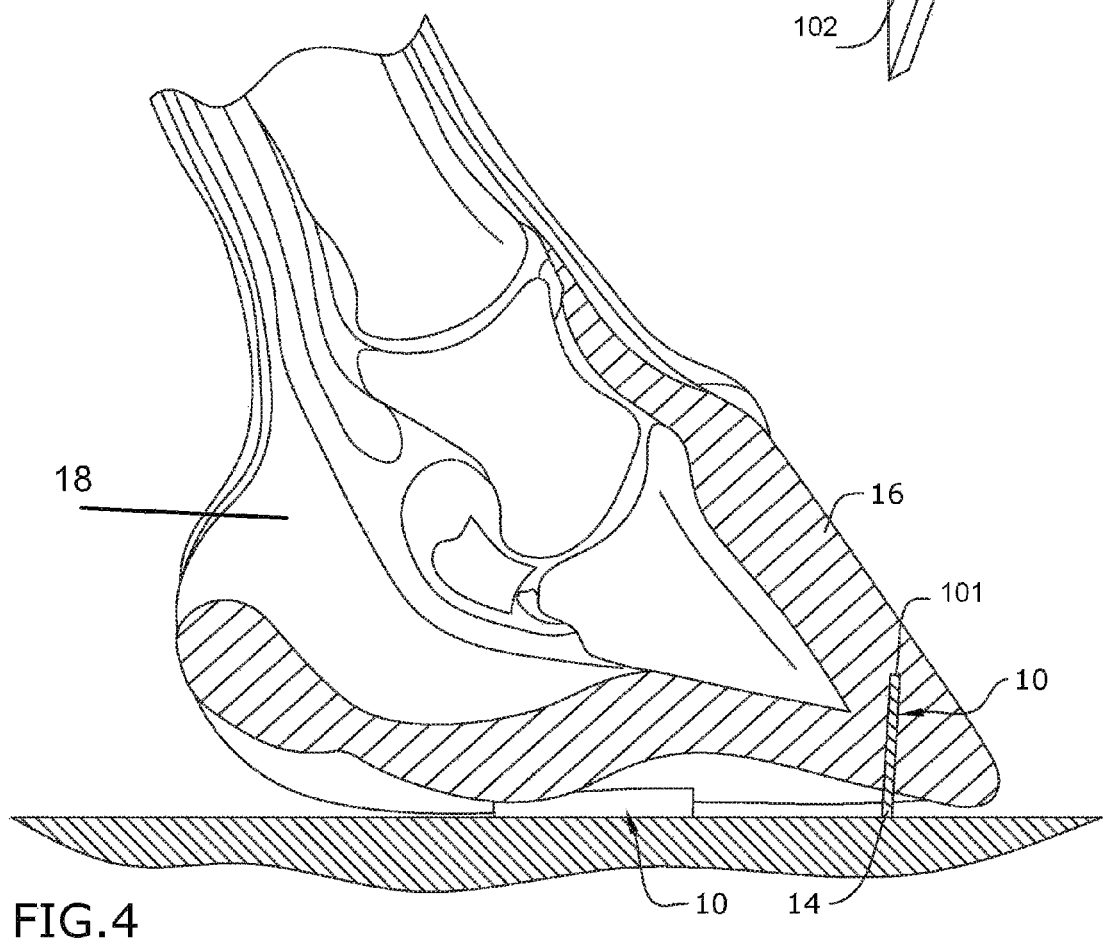
FIG. 4 is a section view of an exemplary embodiment of the present invention, taken along line 4-4 of FIG. 1.

The small size of the hoof tap device 10 enables a user to selectively place a plurality of hoof tap devices 10, spaced apart just inward of the hoof wall 16 of the hoof 18; whereby the tap posts 101, 102 and 103 extend into the hoof 18 so that at least a portion of the tap bridge 14 or back edge 30 protrudes from the hoof 18, as illustrated in FIGS. 1 and 4, enabling the hoof 18 to have natural movement. The hard material of the protruding hoof tap device 10 helps to stop excessive wear and also enables traction and grip.

Each hoof tap device 10 may extend approximately 1.125" in length from end to end. While the transversely joined tap posts 101, 102 and 103 may extend approximately 0.4375" from the back edge 30 to its distal end. If necessary, the dimensions of the hoof tap device 10 be changed to accommodate differently sized animals and purposes.

A method of using the present invention may include the following. The hoof tap device 10 disclosed above may be provided. A user may insert a plurality of hoof tap device 10, spaced apart just inward of the hoof wall 16 of the hoof 18 so that at least a portion of the back edge 30 protrudes therefrom. The hoof tap device 10 would protect the horses hoof 18 and, in certain embodiments, also be used to correct issues in the hoof and it's movement Because it is not a full horse shoe that encompasses the whole foot, the hoof tap device 10 allows for natural movement of the hoof 18 itself while protecting and preserving the wall 16 and sole of the horse's hoof 18.

The present invention can be used with other hoofed animals. Inserted into bone for stability.

It should be understood, of course, that the foregoing relates to exemplary embodiments of the invention and that modifications may be made without departing from the spirit and scope of the invention as set forth in the following claims.

What is claimed is:

1. A device for the protection of a hoof, the device comprising:
   a tap bridge providing an elongated back edge, a front side, a back side, a left side, a right side, a top and a bottom, said top corresponding to the elongated back edge, said front side having a convex surface extending between said left side and said right side, said back side having a concave surface extending between said left side and said right side, and each of said front side and said back side define point-to-point radii of curvature such that the distance between said front side and said back side along a radius of curvature is constant at each point along said convex surface and said concave surface; said radii of curvature collectively defining corresponding point-to-point circumferences that define a circumferential direction that is along said convex surface and said concave surface; so that said left side is located at a circumferentially left end of said convex surface and corresponds to being located at a circumferentially left end of said concave surface, so that said right side is located at a circumferentially right end of said convex surface and corresponds to being located at a circumferentially right end of said concave surface; and
   a first tap post depending from the bottom of the tap bridge at said right side;
   a second tap post depending from the bottom of the tap bridge at said left side;
   wherein the front side and the back side of the tap bridge extend between the first and second tap posts, and
   the first and second tap posts are free from protrusions extending, relative to the tap bridge, in directions radially outward and radially inward of the tap bridge, and
   where the first tap post comprises a barb extending circumferentially to the right of at least one of said convex surface and said concave surface outward in the direction of the right side of the tap bridge,
   wherein the tap bridge is dimensioned and adapted so that the elongated back edge protrudes from a portion of a horse hoof wall.

2. The device of claim 1, further comprising a piercing tip disposed along a distal end of each of the first and second tap posts.

3. The device of claim 2, wherein each piercing tip is generally triangular.

4. The device of claim 1, further comprising a tap tooth disposed between the first and second tap posts, extending from the bottom of the tap bridge.

5. The device of claim 1, wherein the tap bridge extends for approximately 1.125" inches and each of the first and second tap posts extends for approximately 0.4375" inches from the tap bridge to its respective distal end.

6. The device of claim 1, further comprising a third tap post between the first and second tap posts, the third tap post depending from the bottom of the tap bridge.

7. The device of claim 6, further comprising a tap tooth disposed at the bottom of the tap bridge between the first and third tap posts.

8. A device for the protection of a hoof, the device comprising:
   a tap bridge providing an elongated back edge, a front side, a back side, a first end, a second end, a top and a bottom, said top corresponding to the elongated back edge said front side having a convex surface extending between said first end and said second end, said back side having a concave surface extending between said first end and said second end, and each of said front side and said back side define point-to-point radii of curvature such that the distance between said front side and said back side along a radius of curvature is constant at each point along said convex surface and said concave surface; said radii of curvature collectively defining corresponding point-to-point circumferences that define a circumferential direction that is along said convex surface and said concave surface; so that said first end is located at a circumferentially left end of said front side and corresponds to being located at a circumferentially left end of said convex surface, so that said second end is located at a circumferentially right end of said front surface and corresponds to being located at a circumferentially right end of said convex surface;
   a first tap post depending from the tap bridge at the first end;
   a second tap post depending from the tap bridge at the second end;
   a third tap post depending from the tap bridge between the first end and the second end;
   where the first, second and third tap posts are free from protrusions, relative to the tap bridge, outward from the convex surface and the concave surface in directions radially outward and radially inward of the tap bridge;
   where at least one of the first, second and third tap posts comprises a barb extending outward circumferentially along the circumferential direction of the convex surface and concave surface,
   a triangular piercing tip disposed along a distal end of each of the first, second and third tap posts; and a tap tooth disposed at the bottom of the tap bridge between two adjacent tap posts of the first and third or second and third tap posts, wherein the tap bridge is dimensioned and adapted so that the elongated back edge protrudes from a portion of a horse hoof wall.

9. The device of claim 8 wherein the tap bridge extends for approximately 1.125" inches between the first and second ends, and each of the first and second tap posts extends for approximately 0.4375" inches from the tap bridge to its respective distal end.

10. A method of protecting a horse's hoof from excessive wear when the horse steps, while enabling proper expansion of the hoof at the same time, comprising:

providing a plurality of the device of claim 8; and inserting the plurality of the device into the hoof, each of the plurality of the device spaced apart from another of the plurality of the device, and inserted just inward of a hoof wall of the hoof so that at least a portion of each respective elongated back edge protrudes from a bottom of the hoof.

\* \* \* \* \*